Aug. 29, 1944.   J. LEDWINKA   2,357,263
BRAKE MECHANISM
Filed March 19, 1942
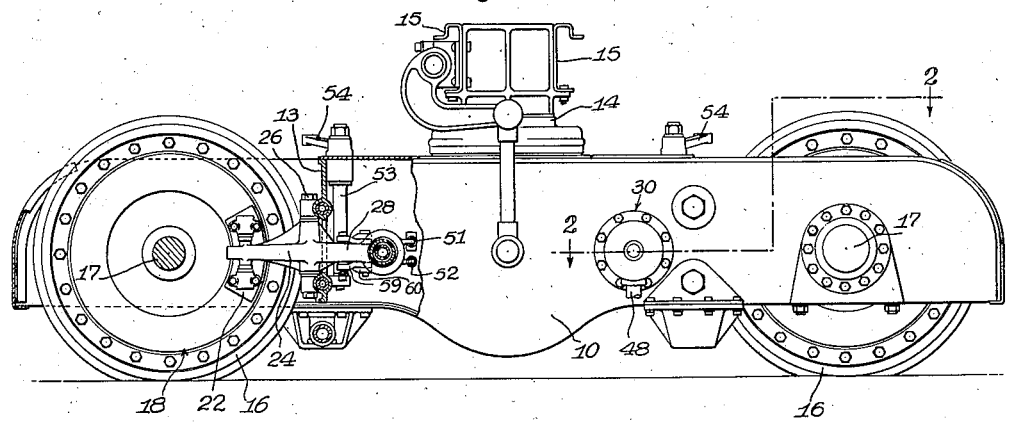
Fig.1.
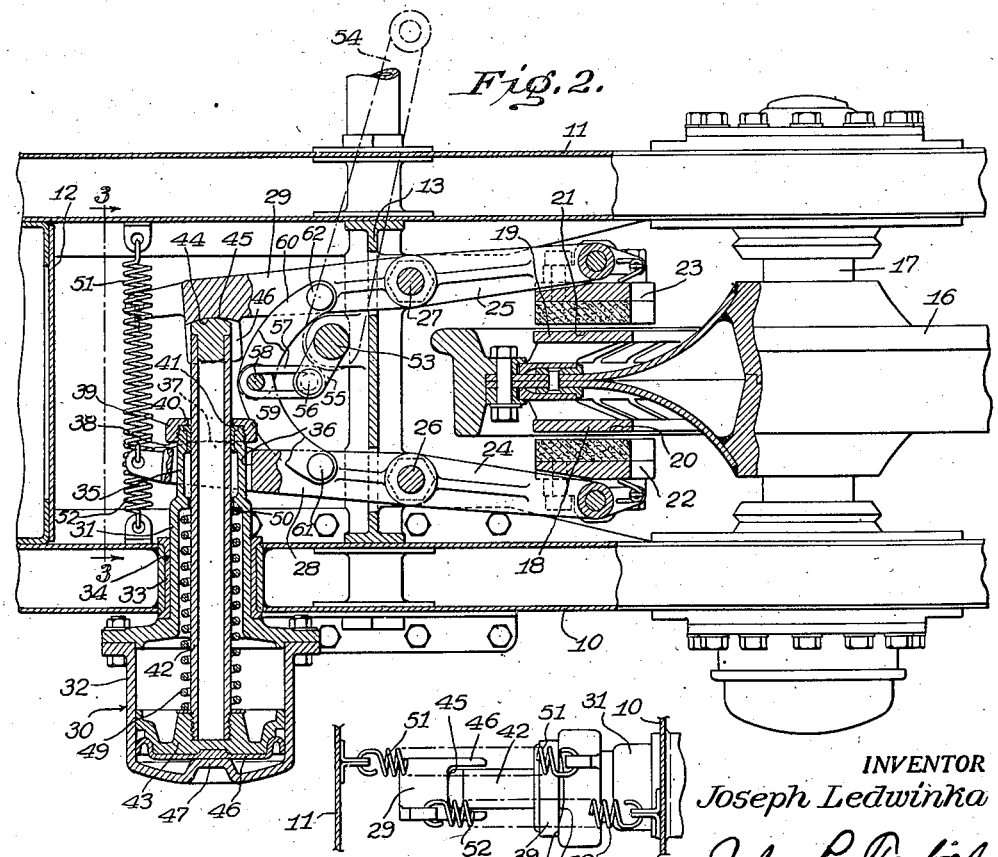
Fig.2.
Fig.3.
INVENTOR
Joseph Ledwinka
BY John P. Darby
ATTORNEY Patented Aug. 29, 1944

2,357,263

UNITED STATES PATENT OFFICE 2,357,263

BRAKE MECHANISM

Joseph Ledwinka, Philadelphia, Pa., assignor to Budd Wheel Company, Philadelphia, Pa., a corporation of Pennsylvania Application March 19, 1942, Serial No. 435,322

9 Claims. (Cl. 188—153)

The invention relates to brake mechanisms and particularly to such mechanisms associated with railway or similar vehicle trucks.

The invention is particularly applicable to trucks of the type having tandem wheels mounted for rotation between two spaced longitudinal girders rigidly secured together at spaced points throughout their lengths, although some aspects thereof may be applicable in other relations.

It is an object of the invention to provide a brake mechanism of this class which is readily assembled and disassembled with the truck and in which the parts, more particularly such parts as require attention from time to time, are freely accessible. Simplicity of construction and low cost of manufacture is another object.

These objects are achieved by mounting the actuating levers for the brake shoes on a transverse connecting member between the side girders so that they may be assembled as a unit with the truck frame. The brake cylinder for actuating said levers has merely abutting relation with said levers for actuating them, so that it can be readily removed as a unit without disturbing the levers and by removing a single screw-threaded element. The cylinder is mounted on the frame so that its weight is not carried by the levers and is preferably floatingly mounted in one of the side members of the frame to automatically adjust itself to the position of the levers and produce an equalized action thereon. By the removal of a single nut, the cylinder and its piston may be withdrawn laterally of the frame for replacement or repair. Other and further objects and advantages and the means by which they are attained will become apparent from the following detailed description when read in connection with the drawing forming a part of this specification.

In the drawing:

Fig. 1 is a side elevational view of a truck to which the invention is shown applied, parts having been broken away and shown in section.

Fig. 2 is an enlarged fragmentary sectional plan view taken substantially along the line 2—2 of Fig. 1.

Fig. 3 is a fragmentary vertical transverse sectional view taken substantially along the line 3—3 of Fig. 2.

In the drawing, the invention is shown applied to a truck of the type shown in copending application Serial No. 417,991, filed November 6, 1941, and which comprises two spaced longitudinally extending girders 10 and 11 connected together at spaced points in their lengths by transverse members, as 12 and 13 and others not shown, the truck being pivotally connected by a vertical pivot 14 near its longitudinal center to the transverse bolster beams 15 forming part of a car body underframe.

The longitudinal girders of the truck frame are supported adjacent their ends by the tandem wheels 16 carried by axles 17 suitably journalled at their ends in the girders 10 and 11.

Since the brake mechanisms associated with each wheel are substantially the same, it will suffice to an understanding of the invention if but one of the brake mechanisms is described in detail.

As shown, each wheel has associated therewith two brake rings designated, respectively, 18 and 19, which are secured to the opposite faces of the wheel to rotate therewith. These rings have, respectively, radial braking faces 20 and 21 arranged to be engaged by respective segmental brake shoes 22 and 23 disposed in cooperative relation thereto.

The shoes are carried, respectively, by actuating or brake levers 24 and 25, these levers being pivoted intermediate their ends on the transverse member 13 through the laterally spaced vertical pivot pins 26 and 27, respectively. The pivot pins are arranged on the side of the member toward the wheel and the arms 28 and 29 of the respective levers 24 and 25 extend through openings in the member 13 into position for simultaneous actuation either by fluid actuation or manual actuation.

For fluid actuation, there is provided a brake cylinder and piston unit designated generally by reference numeral 30, this unit being mounted on the girder 10 by having a reduced inward extension 31 of the larger diameter main body 32 of the cylinder slidably mounted through a suitable anti-friction bearing 33 in a horizontal opening 34 in the girder 10. The extreme inner end 35 of the reduced extension 31 may be still further reduced in diameter and extended freely through an opening 36 in the lever arm 28. At the sides of the opening, on the inner side of the arm 28, rounded bulges, as 37, may be provided, these bulges, forming abutments for engagement by the adjacent faces 38 of a nut 39 screwed on to the reduced end 35 of the cylinder extension 31. This nut has an inwardly extending annular skirt 40 adapted to clamp the bearing sleeve 41 for the piston rod 42 in place. When the nut is tightly drawn up it is securely locked in position. The piston rod 42 of the piston 43 has its rounded convex end 44 in position to abut a rounded concave seat 45 on the lever arm 29 and is guided to this seat by top and bottom lateral projections, as 46, extending away from the seat 45.

The pressure side of the piston 43 may be provided with a suitable cup packing 46 and the piston is normally spaced from the outer end wall of the cylinder by a central boss 47. The fluid pressure for actuating the piston is admitted to this space through a port, not shown, leading to this space, and a conduit, as 48, Fig. 1, connecting with the port. To hold the piston retracted, a compression spring, as 49, may be provided, this spring surrounding the piston rod and engaging at its opposite ends, respectively, the inner face of the piston and an annular shoulder 50 in the reduced extension 31 of the cylinder.

From the foregoing, it will be seen that the cylinder and piston assembly is floatingly supported in the side girder 10 and can be readily removed as a unit by simply unscrewing the single nut 39 forming the abutment engaging the lever arm 28.

To prevent swinging of the levers on their pivots so as to cause the shoes, one or the other, to drag on its associated braking face when the brakes are released, each lever arm 28 and 29 is connected with the opposite girder 10 or 11, respectively, by the light coil springs 51 and 52 as is clear from Figs. 2 and 3.

For the manual operation of the brakes, a vertical shaft 53 having an arm 54 secured to its upper end may be pivoted on the face of the transverse member 13 opposite the lever pivots 26 and 27. Between the lever arms 28 and 29 the shaft 53 is provided with a crank 55 having a pin 56 in its free end projecting through a slotted link 57. The opposite end of this link is engaged by the center pin 58 of the toggle arms 59 and 60 connected by said pin at their adjacent ends and their opposite ends connected to the lever arms, respectively, by the pins 61 and 62. The slot in the link 57 provides the necessary lost motion permitting the fluid actuation without operating the manually-operated shaft and arm 53, 54.

The operation of the brake mechanism will now be briefly described. Assuming the parts are in the release position indicated in Fig. 2, if fluid pressure is admitted to the pressure side of the piston 43, since the piston and cylinder unit are floatingly mounted on the girder 10 they will be forced apart, and through their abutting engagement with the respective lever arms will force the lever arms 28 and 29 apart and thus cause the brake shoes 22 and 23 to approach each other and to engage the respective braking faces 20 and 21 rotatable with the wheel. If one of the shoes engages its braking face before the other, the floating mounting of the cylinder permits it to move laterally so that both brake shoes are finally brought to bear with equalized pressures on their respective braking faces. When the pressure acting on the piston is released, the spring 49 returns the cylinder and piston to their retracted position and the springs 51 and 52 return the levers to inoperative position and maintain them in this position with the shoes spaced from their respective cooperative braking faces on the opposite sides of the wheel.

When the brakes are manually actuated by moving the arm 54 toward the left, Fig. 2, the piston and cylinder remain in their retracted position and the toggle arms 59 and 60 spread the lever arms 28 and 29 to bring the shoes 23 and 24 into braking engagement with their cooperative braking faces in a manner similar to the fluid actuation. The pressure on the shoes is equalized by reason of the free floating connection of the link 57 to the crank 55 and the center pin 58 of the toggle arms. When the brakes are released, the springs 51 and 52 return the levers and shoes to the inoperative position shown in Fig. 2.

While the embodiment of the invention described in detail is a preferred form, it will be understood that changes and modifications may be made by those skilled in the art without departing from the spirit and scope of the claims appended hereto.

What is claimed is:

1. Brake mechanism for a vehicle having longitudinal members supported by a wheel and axle assembly, spaced braking faces rotating with a wheel of said assembly, brake levers extending generally in the longitudinal direction of said members and supported thereby intermediate the ends of the levers for pivotal movement, brake shoes carried by the adjacent ends of said levers in cooperative relation to the respective braking faces rotating with the wheel, and a brake cylinder and piston assembly floatingly supported by at least one of said longitudinal members and having abutting engagement, the piston and cylinder, respectively, with the ends of the levers remote from their ends supporting the shoes.

2. Brake mechanism comprising a support, a brake cylinder and piston mounted in the support and removable from one side thereof for floating movement thereon, brake levers pivotally mounted on the other side of said support, abutment means on said cylinder and piston for engaging the respective levers for actuating them, one of said abutments being removable to disconnect the brake cylinder and piston from the levers and permit their withdrawal as a unit from the side of the support opposite the one on which the levers are mounted.

3. Brake mechanism comprising a support, a cylinder and piston unit floatingly mounted for insertion from one side of the support and for movement in the support along the axis of the unit, said cylinder and piston each having abutment means for engagement with members on one side of said support, one of said abutment means being removable to permit withdrawal of the unit from the support.

4. Brake mechanism for a vehicle having spaced longitudinal members, and a wheel rotatably mounted between them, comprising annular braking faces rotating with the wheel and disposed on opposite faces thereof, levers extending longitudinally in the space between said members and pivoted on spaced pivots on a transverse member interconnecting said longitudinal members, brake shoes carried by the respective levers in cooperative relation to the respective braking faces, and a brake cylinder and piston unit disposed in the plane of said levers and floatingly supported by one of said longitudinal members, the cylinder of said unit having abutting engagement with one of said levers and the piston with the other for actuating the levers to bring the shoes carried thereby into equalized braking engagement with the respective annular braking faces.

5. Brake mechanism for a vehicle having spaced longitudinal members and a wheel rotatably mounted between them, comprising annular braking faces rotating with the wheel and disposed on opposite faces thereof, levers extending longitudinally in the space between said members and pivoted on a transverse member interconnecting said longitudinal members, brake shoes carried by the respective levers in cooperative relation to the respective braking faces, and a brake cylinder and piston unit insertable from the outside of, and floatingly supported by, one of said longitudinal members, the cylinder of said unit including abutment means for abutting engagement with one of said levers and the piston having abutment means for similar engagement with the other of said levers, one of said abutment means being removable to permit assembly and disassembly of the cylinder and piston unit with the longitudinal member and levers.

6. A brake mechanism for railway car trucks having a wheel provided with braking faces on opposite sides thereof, a longitudinally extending frame member, longitudinally extending pivoted brake levers on one side of said frame member having brake shoes thereon operatively associated with said braking faces, a fluid pressure cylinder positioned on the other side of said frame member and provided with an extension projecting freely through an opening in said frame member, means on said extension for operating one of said levers, and a piston rod projecting through said extension for operating the other of said levers.

7. A brake mechanism for railway car trucks having a wheel provided with braking faces, a longitudinal frame member supported on said wheel, longitudinally extending brake levers mounted at one side of said longitudinal frame member and having brake shoes thereon operatively associated with said braking faces, and relatively movable lever operating members mounted on the other side of said longitudinal frame member and extending through an opening in said frame member for engagement with each of said levers.

8. A brake mechanism for railway car trucks having a wheel provided with braking faces, a longitudinal frame member supported on said wheel, longitudinally extending brake levers mounted at one side side of said longitudinal frame member and having braking shoes thereon operatively associated with said braking faces, and relatively movable lever operating members mounted on the other side of said longitudinal member and extending through an opening in said frame and through an opening in one of said levers for engagement with each of said levers.

9. A brake mechanism for railway car trucks having a wheel provided with braking faces on both sides thereof, a longitudinal frame member, longitudinally extended pivoted brake levers on one side of said frame member having brake shoes thereon operatively associated with said braking faces, a fluid pressure cylinder positioned on the other side of said frame member and provided with an extension projecting freely through an opening in said frame member and freely through an opening in one of said levers, means on said extension for operating one of said levers, and a piston rod projecting through said extension for operating the other of said levers.

JOSEPH LEDWINKA.